(12) United States Patent
Degtiarenko et al.

(10) Patent No.: US 7,737,874 B1
(45) Date of Patent: Jun. 15, 2010

(54) METHOD OF MULTI-CHANNEL DATA READOUT AND ACQUISITION

(75) Inventors: Pavel V. Degtiarenko, Williamsburg, VA (US); Vladimir E. Popov, Newport News, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 208 days.

(21) Appl. No.: 12/215,453

(22) Filed: Jun. 28, 2008

(51) Int. Cl.
*H03M 1/60* (2006.01)

(52) U.S. Cl. .................................. 341/157; 341/110
(58) Field of Classification Search ................. 341/110, 341/157
See application file for complete search history.

(56) References Cited

U.S. PATENT DOCUMENTS

| | | | | |
|---|---|---|---|---|
| 3,838,413 A | * | 9/1974 | Wehrmann | 341/170 |
| 3,942,110 A | * | 3/1976 | Milkovic | 324/142 |
| 5,001,360 A | * | 3/1991 | Hartwig | 327/101 |
| 5,119,096 A | * | 6/1992 | Marschall | 341/157 |
| 5,361,048 A | * | 11/1994 | Baum et al. | 332/109 |
| 2006/0080722 A1 | * | 4/2006 | Santhoff | 725/116 |
| 2007/0273411 A1 | * | 11/2007 | Harris et al. | 327/103 |
| 2009/0070514 A1 | * | 3/2009 | Moriyama et al. | 710/311 |

* cited by examiner

*Primary Examiner*—Howard Williams

(57) ABSTRACT

A method for dealing with the problem of simultaneous continuous readout of large number of data channels from the set of multiple sensors in instances where the use of multiple amplitude-to-digital converters is not practical or causes undesirable extra noise and distortion in the data. The new method uses sensor front-end s and subsequent electronics to transform the analog input signals and encode them into a series of short pulses that can be transmitted to a long distance via a high frequency transmission line without information loss. Upon arrival at a destination data decoder and analyzer device, the series of short pulses can be decoded and transformed back, to obtain, store, and utilize the sensor information with the required accuracy.

1 Claim, 4 Drawing Sheets

METHOD OF MULTI-CHANNEL DATA READOUT AND ACQUISITION

The United States of America may have certain rights to this invention under Management and Operating Contract DE-AC05-06OR23177 from the United States Department of Energy.

FIELD OF THE INVENTION

The present invention relates to data acquisition systems and more particularly to issues associated with simultaneous and continuous data readout from a large number of data channels.

BACKGROUND OF THE INVENTION

The problems associated with simultaneous and continuous data readout from a large number of data channels is common in modern industrial, engineering, or scientific installations, test setups, or continuous monitoring systems requiring prompt readout and collection of a large number of analog data readings from various detectors, monitors, and probes of different types (sensors). Many of such sensors provide, via their corresponding front-end electronics devices, electrical current (or Voltage) outputs, that need to be directed to current (or Voltage) meters, or current-, or Voltage-Amplitude-to-Digital Converters (ADCs), etc., in which the input signal levels are digitized and stored in the on-board memory of the ADC. A system capable of reading all the data acquisition systems into an on-line computer system for analyzing and utilizing of the measured data, and storing it in the archives is then used. In any case where the number of channels is large, the intermediate computer stations may need to specifically handle the ADC operation, and to provide the data flow to the main data acquisition system computer.

In many circumstances, due to radiation, temperature, humidity, or other environmental conditions, or due to limited access requirements, it is desirable to have the ADC stations and the control computers distant from the sensors. In such arrangements, there is a need for a large number of separate electric cables, or other means, to connect multiple sensors with the ADC inputs. Often such long cables become the source of undesirable extra noise and distortion in the data. Sometimes space limitations create difficulties in the use of such cables.

There thus remains a need for systems for the conversion and acquisition of signals from multiple sensors in systems using multiple amplitude to digital converters without the need for the installation of extended cabling that can introduce undesirable noise or distortion into transmitted data signals.

OBJECT OF THE INVENTION

It is therefore an object of the present invention to provide an enhanced system for the conversion and acquisition of simultaneously and continuously generated data readout signals from a multitude of sensors without using multiple amplitude to digital converters each connected to the corresponding sensor with an electrical cable.

SUMMARY OF THE INVENTION

A method for handling simultaneous and continuous readout of large numbers of data channels from multiple sensors when the use of multiple amplitude-to-digital converters is not practical or causes undesirable extra noise and distortion in the data comprising: transforming analog input signals from a large numbers of simultaneous and continuous data channels from multiple sensors to frequency signals; encoding the frequency signals into a series of short pulses that can be transmitted via a high frequency transmission line; transmitting the series of short pulse to a remote data decoder and analyzer device; decoding the series of short pulses in the analyzer device; and transforming the series of short pulses back to the original simultaneous and continuous readout data for storage, and utilization.

DETAILED DESCRIPTION

Figure 1:
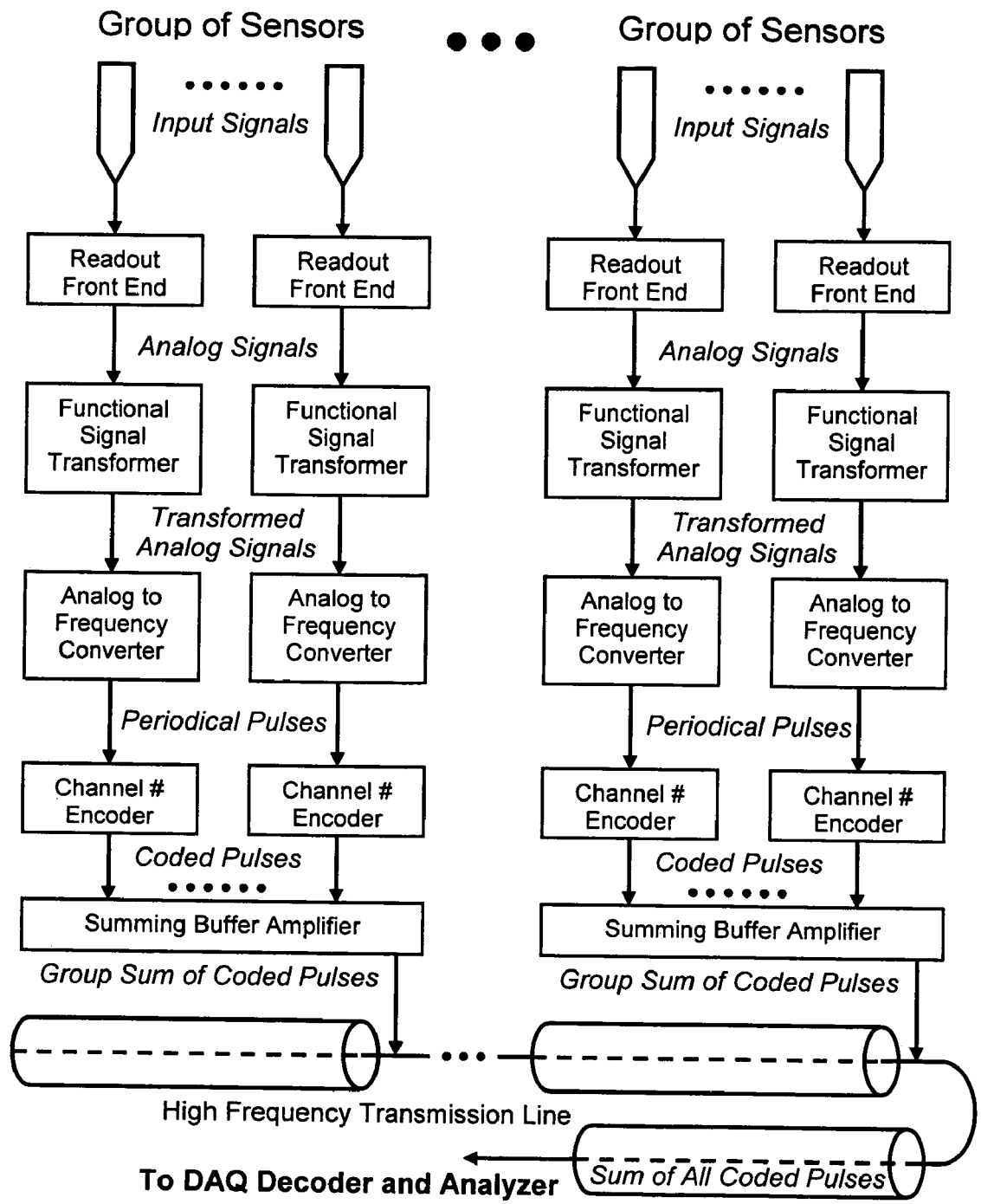
FIG. 1 is a block diagram of a continuous and simultaneous multi-channel data acquisition with a single high-frequency transmission line connected to the data acquisition system decoder and analyzer in accordance with the present invention.

The method and apparatus of the present invention utilizes a portion of the front-end electronics of a data acquisition system to encode the analog information from a plurality of sensor readout channels into a series of periodic pulses. The resulting signals are then transmitted over a single transmission line to a central data acquisition computer situated at a conveniently long distance from the installation. The transmission line can comprise RF or optical cable, or a radio transmitter, or other type of transmitter using sufficiently high carrying frequency. If a specific sensor direct output is represented by a series of periodic pulses, and the frequency of these pulses is to be measured, then the pulses don't have to be converted and can be transmitted directly. Every output signal in the data stream is uniquely characterized by its signal amplitude or width, by converting it to a series of coded short pulses, or by using a combination of the these methods. The period between signals of the same unique type is a known function of the value of the corresponding sensor output. Many readout channels encoded in such manner can be merged electronically into one or several chained signal summing devices. To make subsequent signal decoding easier, signal overlapping in the transmission line is reasonably small. If overlap is less than about 5-10%, the results decoding is reliable. Such small overlap can be achieved by selecting a signal width that is as small as practical. Typical signal width should be significantly smaller than the average signal period, divided by the number of channels. The encoding function may include relatively infrequent random changes in the times of the next signal in the series, to avoid rare situations in which several sensors in the system are al generating very close pulse frequencies, with the chance to produce long sequences of piled-up signals. Random timing breaks will not hamper the ability of the decoder to extract the signal frequencies and will break the long pile-op series if they occur.

The output from the front end electronics summing hardware can be sent through the transmission line to a long distance and delivered to the signal decoder. In the decoder the RF or other input is read continuously, or intermittently for appropriate time spans, by single channel, high frequency data sampling hardware, such as, for example, a digital oscilloscope, a high sampling rate data acquisition board in a specialized computer, or a specialized electronics hardware setup. The use of multi-channel readout hardware and multiple transmission lines may be practical and advisable if it is desirable to diminish the single channel loads.

Information flow, as read by the data sampling hardware, presents a series of data points read with a high repetition rate appropriate for a given set of measurements. There is a wide variety of commercially available hardware capable of continuous, or intermittent, data sampling at frequency ranges from tens of kHz to few GHz. The transmitted periodic signals delivered from the data encoders to the sampling hardware via the transmission line should be extended enough in time to cover several sampling readout cycles to allow the data analysis software to determine signal uniqueness with sufficient precision as to all distinguishing between the different incoming signals.

As a result of analysis of the sampled input data stream, given enough time to read and decode a certain number of input signals of every type, the decoder is able to determine frequencies of input signals. The measurement of frequency for every type of input signal is accomplished by storing the number of the input data sample corresponding to the beginning of each signal, and comparing it with the corresponding number of the input data sample from the previously detected signal of the same type. The difference between the two numbers and the sample frequency determine the time interval between the signals. To avoid events when the signal identification fails due to overlapping with signals of other type coming from other sensors, and assuming that such events are relatively rare, the number of interval readings for every channel is analyzed statistically, the most probable value is found and the result is obtained by averaging the values in the vicinity of the maximum. The signal frequency, determined in such or similar way for every input channel, can be converted back into the corresponding current or voltage readout in accordance with the input signal transformation algorithm used to convert the sensor current or voltage into the signal frequency. If the signal frequency is a value which is measured by the corresponding sensor, then the decoded signal frequency can be used directly as the system output.

As a practical example, consider a monitoring system required to produce readings from 100 sensors every second. Assuming that 10 measured signal periods is enough to extract the signal frequency reliably, all single channel frequencies above 10 Hz are required. If the average signal frequency in the channels is 100 Hz, then the average frequency of the pulses in the transmission line is 10 kHz, corresponding to the average time interval between the pulses equal to 100 µs. If the signal pulse width is chosen to be 1 µs, suitable for a substantially long transmission line, then the crude estimate of the probability for a given signal to overlap with some other signal in the transmission line is 1%, which is acceptable. The relative precision in the period measurement in such conditions may be evaluated roughly as the ratio of the duration of one high frequency sample to the total time of measurement. If the transmission line is sampled with the frequency of 10 MHz, then the relative precision in the measured signal period, which can be achieved during a 1 second measurement, is $10^{-7}$, assuming that all elements in the signal transfer chain can perform with such a degree of stability. The achievable measurement precision of such a system depends on the quality and stability of the elements, and the type of the functional signal transformation used.

Among the advantages of the data readout and acquisition system of the present invention are:

1. low noise, and low distortions in the data, achievable because the low-level sensor signals are processed as close to the sensors as possible, and then well defined coded signals are transmitted without loss of information;

2. transmission of multiple coded data signals using a single transmission line, providing a universal signal flow format for multiple channels of data input from sensors of different kind;

3. a flexible design to optimize dynamic range of the readings as needed;

4. possible savings in hardware cost in terms of signal cables, ADC channels and IO controllers for multiple channel data acquisition systems.

Figure 2:
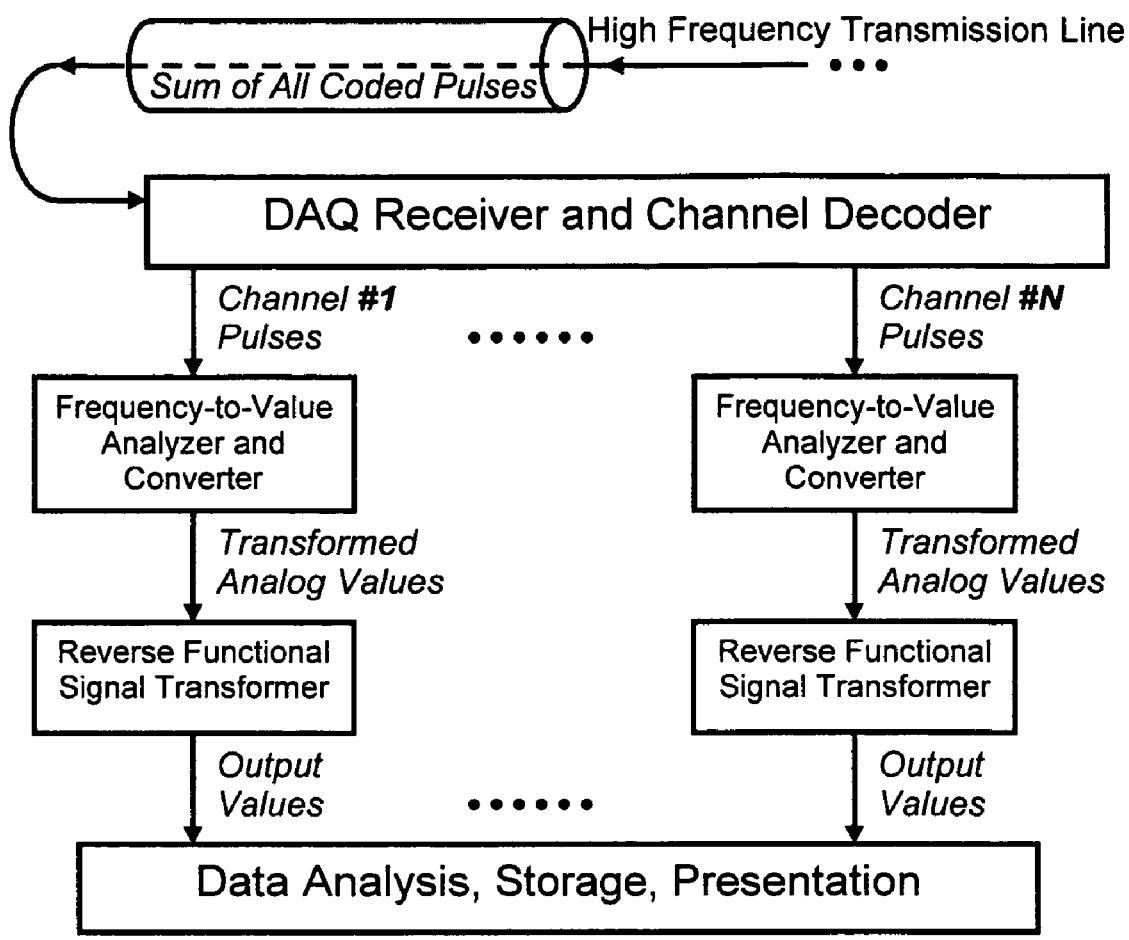
FIG. 2 is a block diagram of the data acquisition decoder and analyzer portion of the system of the present invention.
Figure 3:
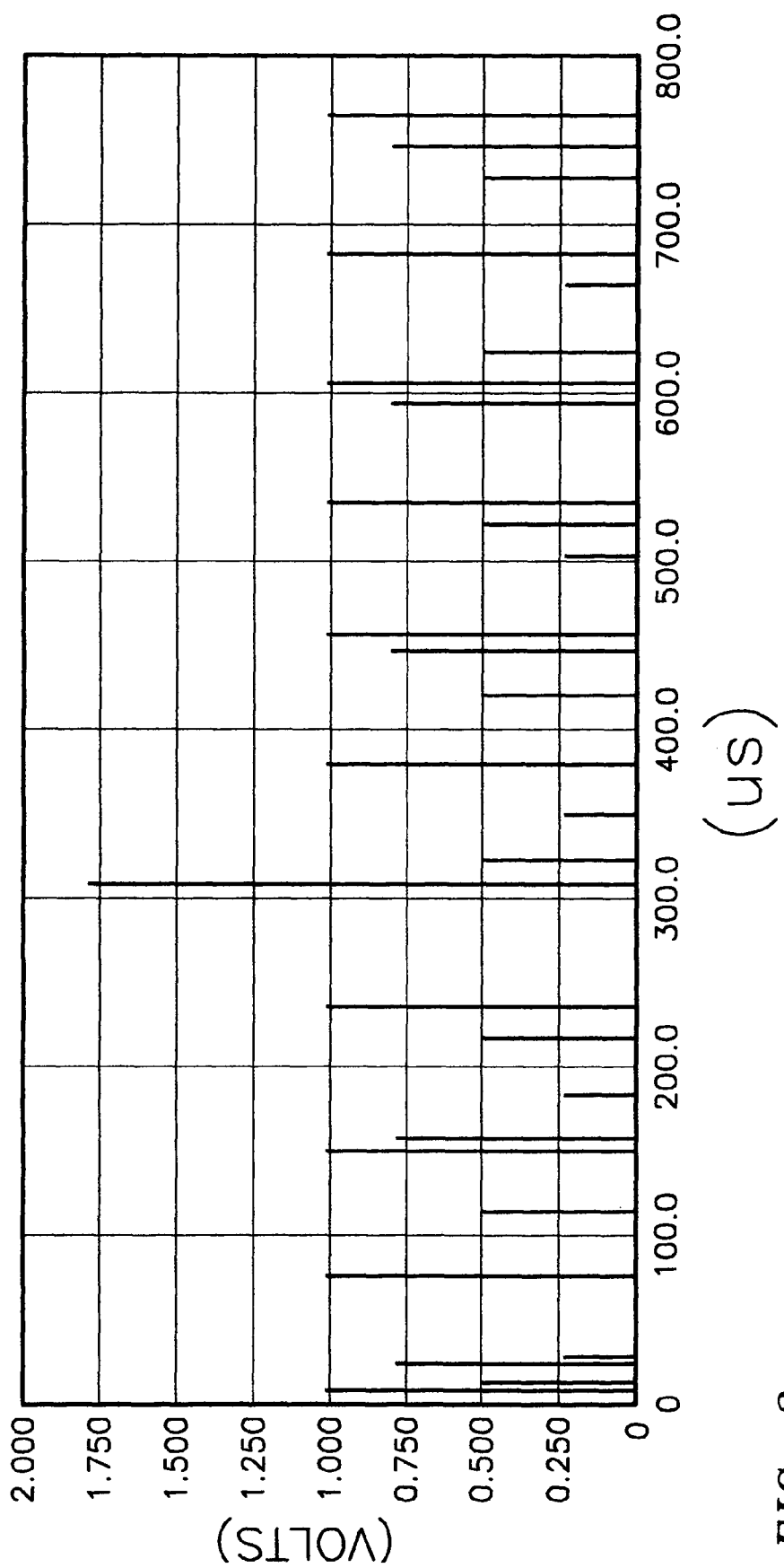
FIG. 3 shows simulated signals in a transmission line connected to several channel number encoders using pulse amplitude encoding in accordance with the present invention.
Figure 4:
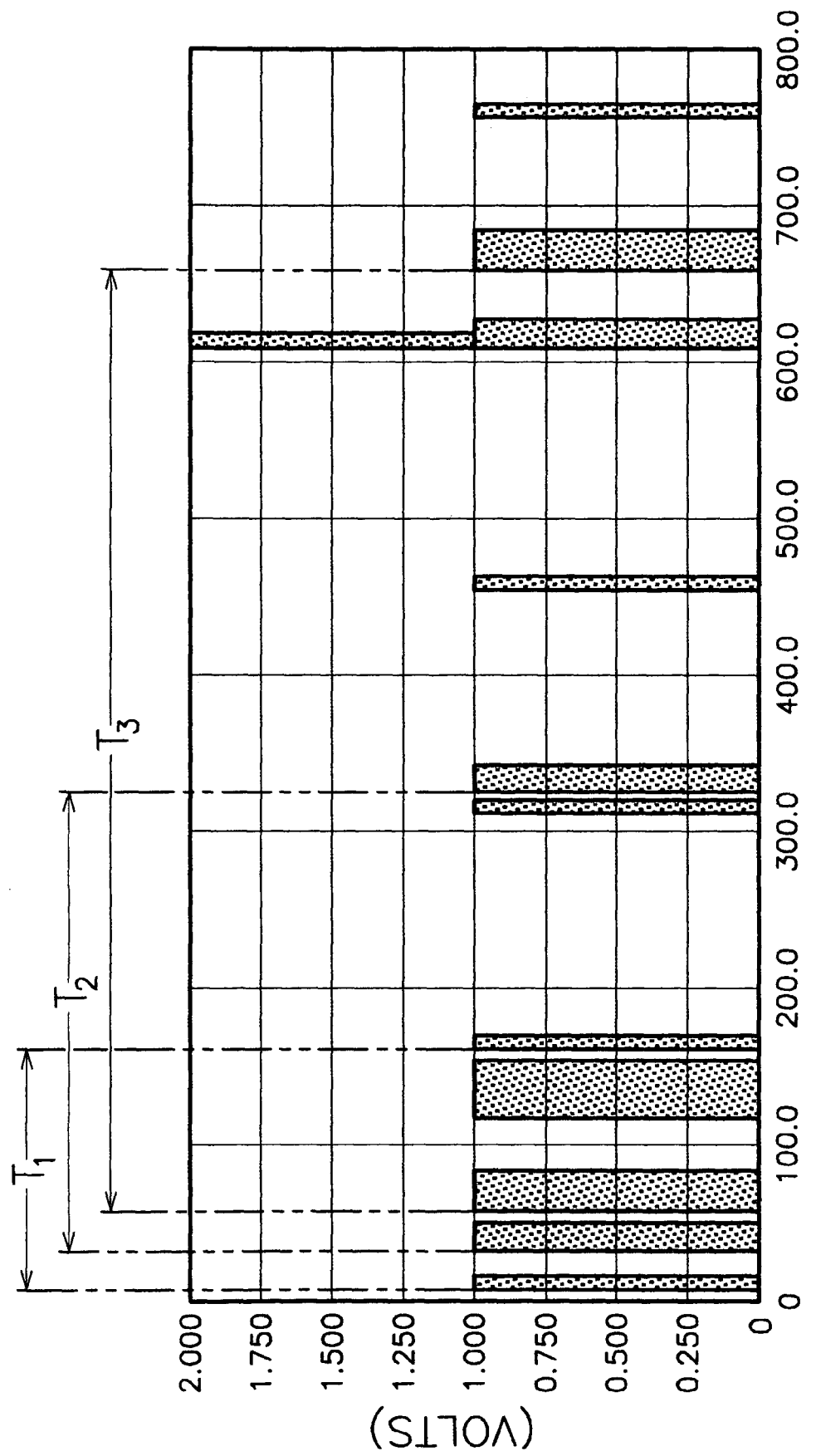
FIG. 4 shows simulated signals in a transmission line connected to several channel number encoders using pulse width encoding in accordance with the present invention.

Block diagrams of the apparatus of the present invention are presented in FIGS. 1 and 2, and examples of pulse encoding techniques in accordance with the present invention are shown in FIGS. 3 and 4.

FIG. 1 illustrates the logical elements that provide the signal transformation and encoding paths from a multitude of different sensors to the single high frequency transmission line which delivers the coded signals to the remote data acquisition decoder and analyzer. As will be apparent to the skilled artisan, a variety of implementations can be designed to combine many of these functions into a smaller number of blocks, depending upon the type of sensor and the task to be accomplished. Each sensor providing an analog input signal is connected to the chain comprising the front-end readout (FER) block, the functional signal transformer (FST) block, the analog-to-frequency converter (AFC) block, and the channel number encoder (CNE) block. The FER block provides the direct interface between the sensor and the readout system. The combination of FER and FST blocks brings the analog signal and its dynamic range to values suitable for the operation of the next stage AFC block, which produces as its output the periodic pulses at a frequency proportional to the analog signal of its input. The function of the CNE block is to make each pulse at its input uniquely identifiable at the output. This is achieved by different methods, including setting specific unique amplitudes for each pulse, setting specific unique output pulse widths, or producing a coded logical series of short pulses which are uniquely set for a given channel (or by a combination of above methods, or by other means). Outputs from a group of CNE channels, physically close to each other, are directed to the inputs of a summing buffer amplifier (SBA), with its single output connected to the high frequency transmission line (HFTL) which could be an RF cable, optical cable, wireless, etc. Several groups of sensors can all be connected to the same one HFTL, each via the corresponding SBA module, as long as all the non-overlapping signals in the system can be uniquely identified upon readout, and the combinations of all pulse frequencies and pulse widths are such that the overlapping of the pulses in the HFTL is reasonably small.

Depending on the type of sensor and the task, the functionality of the logical blocks in the chains can be combined within fewer electronics blocks. For sensors operating in the mode of a current generator (for example, some types of radiation detectors), it would make sense to combine the functions of the FER and FST blocks. If the problem at hand requires monitoring of a relatively constant level of input current, the combination of FER and FST can be realized as a relatively simple linear current-to-voltage input cascade, tuned in with the corresponding AFC block such that the nominal current produced in the pulse frequency is in an acceptable range. If, on the other hand, the problem requires current monitoring over the range of several orders of magnitude, a logarithmic current-to-Voltage converter as the FER+FST combination should be used, allowing compression of the large input signal dynamic range into an acceptable range of pulse frequencies. Different types of sensors may require more complicated designs of the FER and FST blocks.

If a sensor output is non-analog, the design of the FER+FST blocks should correspond to the signal characteristics such that the resulting pulse frequency is within the operating range of the system. If a sensor produces an output signal in the form of pulses with acceptable frequency, there is no need for the AFC, FST, or FER blocks, or their combination.

FIG. 2 shows a block diagram of the data acquisition and decoder/analyzer portions of the system of the present invention. The output from the summing hardware is transmitted through the HFTL and delivered to the DAQ receiver and signal decoder. In the receiver the signal input is read continuously, or intermittently for appropriate time spans, by single channel, high frequency data sampling hardware. The data flow from the receiver is analyzed and decoded in such way that the unique signal types can be detected in the flow, and the time periods between the consecutive unique signals are accumulated and analyzed in a specialized frequency-to-value analyzer and converter. If the functional signal transformation function was implemented when the signal was encoded, the optional reverse functional signal transformation block converts the analog signal to its original form. Finally, the data become available for analysis, storage, and presentation. The embodiment of this part of the system can be realized in many ways, including general use, or specialized computers, programmable oscilloscopes, or using specially designed electronic components.

FIGS. 3 and 4 demonstrate two pulse encoding techniques applicable in some of the embodiments of the method of the present invention. The first, shown in FIG. 3, uses pulse height, and the second, shown in FIG. 4, uses pulse width as the identifier for the channel number. Pulse height encoding allows the use of short pulses, thus decreasing the probability of the signal pileup in the transmission line, but requires a high quality transmission line and good and highly stable signal sampling hardware in the data acquisition decoder to resolve pulses of different heights coming from different channels. The pulse width modulation method allows lessening the requirements on the quality of the transmission line and the sampling hardware at the expense of increasing the average pulse width, and thus effectively decreasing line throughput. The choice of encoding method for a particular implementation thus depends upon the particular requirements of the application.

In FIG. 3, $A_1$, $A_2$, and $A_3$ represent signals with different amplitude values corresponding to the three different sources. $T_1$, $T_2$ and $T_3$ are the time periods corresponding to the acquisition of these signals. Pulse pileup is a rare event which may be detected because of its unusual signal height and shape. The pileup can be rejected, or can be taken into account during data processing.

In FIG. 4, $W_1$, $W_2$, and $W_3$ represent signals with different widths corresponding to three different signal sources. $T_1$, $T_2$ and $T_3$ are the time periods corresponding to these signals. Again, pulse pileup can be detected because of its unusual signal height and shape. The pileup can be rejected, or can be taken into account during data processing.

As the invention has been described, it will be apparent to those skilled in the art that the same may be varied in many ways without departing from the intended spirit and scope of the invention, and any and all such modifications are intended to be included within the scope of the appended claims.

What is claimed is:

1. A method for handling simultaneous and continuous readout of large numbers of data channels from multiple sensors when the use of multiple amplitude-to-digital converters is not practical or causes undesirable extra noise and distortion in the data comprising:

A) transforming analog input signals from a large numbers of simultaneous and continuous data channels from multiple sensors to frequency signals;

B) encoding the frequency signals into a series of short pulses that can be transmitted via a high frequency transmission line;

C) transmitting the series of short pulse to a remote data decoder and analyzer device;

D) decoding the series of short pulses in the analyzer device; and

E) transforming the series of short pulses back to the original simultaneous and continuous readout data for storage, and utilization.

\* \* \* \* \*